United States Patent
Li et al.

(10) Patent No.: US 9,735,685 B2
(45) Date of Patent: Aug. 15, 2017

(54) INTERLEAVED LLC CURRENT EQUALIZING CONVERTER

(71) Applicant: EATON CORPORATION, Cleveland, OH (US)

(72) Inventors: Kunfeng Li, Shenzhen (CN); Huali Zhang, Shenzhen (CN); Denis Deng, Shenzhen (CN); Jack Gu, Shenzhen (CN); Yuefeng Yang, Shenzhen (CN)

(73) Assignee: Eaton Corporation, Cleveland, OH (US)

( * ) Notice: Subject to any disclaimer, the term of this patent is extended or adjusted under 35 U.S.C. 154(b) by 161 days.

(21) Appl. No.: 14/437,416

(22) PCT Filed: Oct. 17, 2013

(86) PCT No.: PCT/CN2013/085402
§ 371 (c)(1),
(2) Date: Aug. 24, 2015

(87) PCT Pub. No.: WO2014/063590
PCT Pub. Date: May 1, 2014

(65) Prior Publication Data
US 2015/0357921 A1    Dec. 10, 2015

(30) Foreign Application Priority Data
Oct. 22, 2012    (CN) .......................... 2012 1 0404331

(51) Int. Cl.
*H02M 1/14* (2006.01)
*H02M 3/335* (2006.01)
(Continued)

(52) U.S. Cl.
CPC ......... *H02M 3/33507* (2013.01); *H02M 1/14* (2013.01); *H02M 3/285* (2013.01);
(Continued)

(58) Field of Classification Search
CPC ......... H02M 1/14; H02M 1/143; H02M 3/285
See application file for complete search history.

(56) References Cited

U.S. PATENT DOCUMENTS

| | | |
|---|---|---|
| 6,181,576 B1 | 1/2001 | Ikeda et al. |
| 7,239,530 B1 | 7/2007 | Djekic et al. |

(Continued)

FOREIGN PATENT DOCUMENTS

| | | |
|---|---|---|
| CN | 101702854 | 5/2010 |
| CN | 102638167 A | 8/2012 |

(Continued)

OTHER PUBLICATIONS

International Search Report Corresponding to International Application No. PCT/CN2013/085402; Date of Mailing: Jan. 16, 2014; 2 Pages.

(Continued)

*Primary Examiner* — Harry Behm
(74) *Attorney, Agent, or Firm* — Ward and Smith, P.A.

(57) ABSTRACT

The present invention discloses an interleaved LLC convertor with current sharing. The interleaved LLC convertor with current sharing comprises: an interleaved LLC circuit, consisting of an even number of LLC circuits connected in parallel; and a plurality of windings with the same quantity as that of the LLC circuits, wherein all first polarization terminals from each of LLC circuits at its DC output side together constitute a first output terminal; all first terminals from each of the windings together constitute a second output terminal; a first half of the plurality of windings surround a magnetic core in a first direction, and a second half of the plurality of windings surround the magnetic core in a second direction; each of the plurality of windings has the same inductance, and the first half of the plurality of windings are inversely coupled with the second half of the plurality of windings; and the second polarization terminal (Continued)

of each LLC circuit at its DC output side connects to a second terminal of one of the windings.

11 Claims, 10 Drawing Sheets

(51) Int. Cl.
 *H02M 3/28* (2006.01)
 *H02M 1/00* (2006.01)
(52) U.S. Cl.
 CPC ............. *H02M 2001/0003* (2013.01); *H02M 2001/0058* (2013.01); *Y02B 70/1491* (2013.01)

(56) References Cited

U.S. PATENT DOCUMENTS

| 9,065,343 | B2* | 6/2015 | Hu | H02M 3/33507 |
| 2001/0024377 | A1* | 9/2001 | Arai | H02M 3/285 363/98 |
| 2009/0001945 | A1* | 1/2009 | Wickersham | H02M 3/1584 323/263 |
| 2009/0066307 | A1* | 3/2009 | Osterhout | H02M 3/1584 323/283 |
| 2011/0069514 | A1* | 3/2011 | Chiba | H02M 3/33569 363/21.02 |
| 2012/0274291 | A1* | 11/2012 | Ge | H02M 3/33523 323/267 |
| 2014/0153293 | A1* | 6/2014 | Chang | H02M 3/3376 363/21.02 |

FOREIGN PATENT DOCUMENTS

| JP | 2003-164151 A | 6/2003 | |
| JP | 2005-33956 A * | 2/2005 | ............. H02M 3/28 |
| JP | 2005033956 | 2/2005 | |

OTHER PUBLICATIONS

European Search Report; corresponding EP Application No. 13849068.5; mailed Jan. 23, 2017.

* cited by examiner

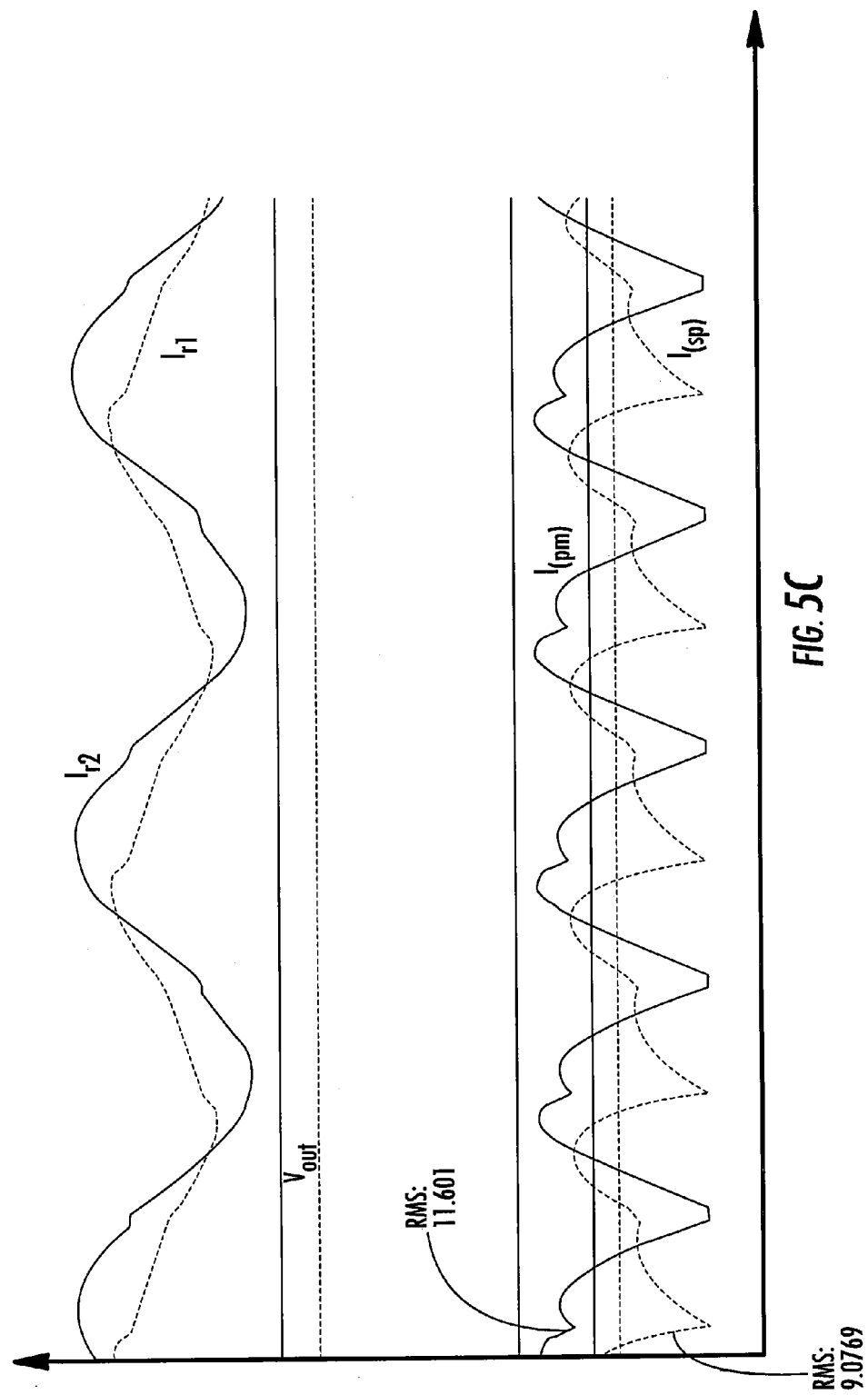

US 9,735,685 B2

INTERLEAVED LLC CURRENT EQUALIZING CONVERTER

RELATED APPLICATIONS

The present application is a 35 U.S.C. §371 national phase application of PCT International Application No. PCT/CN2013/085402, having an international filing date of Oct. 17, 2013, claiming priority to Chinese Patent Application No. 201210404331.2, filed Oct. 22, 2012. The disclosures of each application are incorporated herein by reference in their entireties. The above PCT International Application was published in the Chinese language as International Publication No. WO 2014/063590

FIELD OF THE INVENTION

The present invention generally relates to an LLC convertor, and more particularly, to an interleaved LLC convertor with current sharing.

BACKGROUND OF THE INVENTION

LLC topology (as shown in FIG. 1) is widely used in various kinds of products, such as LCD TV, networking power supply etc. LLC has at least following advantages: a) achieving ZVS for switching transistors without extra circuits, meeting the requirement of high frequency and high efficiency at the same time; b) ZCS for secondary rectification at the secondary side and low voltage stress, which contribute to high efficiency, therefore being very suitable for two stage topology with PFC as its first stage to improve the efficiency of AC input and DC output; c) no output inductance and low cost; and d) easy for magnetic integration in the applications lower than 500 W.

LLC topology is widely used due to the above advantages. However, LLC has no output filter inductance, which means, in order to solve the problem of large current ripple, a lot of capacitors connected in parallel in the output terminal are required to absorb the current ripple, especially in the low output voltage/high current/high power applications. Compared with the regular LLC topology, interleaved LLC topology (as shown in FIG. 2) can solve the current ripple problem significantly, and reduce the stress on the capacitors, which makes interleaved LLC a better solution in high power or high current level applications. In the interleaved LLC, two LLC convertors operate in parallel under the condition that there is 90° phase difference between the drivers. The parameters of the two resonant cavities may not be completely consistent with each other in practical application. Given the interleaved LLC has the same output voltage, the gain would be the same. When there is a tolerance between the parameters of the two resonant cavities, the following would happen:

$f_{r1} \neq f_{r2} \rightarrow f_{n1} \neq f_{n2}$ $G_1 = G_2 \rightarrow Q_1 \neq Q_2 \rightarrow I_{o1} \neq I_{o2}$.

As shown above, when the parameters of the two resonant cavities are not consistent with each other, the two transformers, $T_1$ & $T_2$, of the interleaved LLC, will be under different load conditions. And the worse the tolerance between the resonant parameters is, the more serious the current unbalance would be. As shown in FIG. 3, when a 900 W HB (Half-Bridge) interleaved LLC having resonant parameters with ±5% tolerance operates at full load, the current output $I_{o1}$ of one of the LLC convertors would be almost zero and thus under light load condition. In practical application, under the worst tolerance condition, one of the LLC is at light load, while the other LLC convertor has been already overloaded or even damaged when the condition is really serious. Unfortunately, to accurately learn the resonant parameters (resonant inductance $L_r$, resonant capacitance $C_r$) is always very difficult for an interleaved LLC, which becomes the bottleneck of the application of the interleaved LLC.

SUMMARY OF THE INVENTION

The present invention intends to overcome the current sharing issue of the interleaved LLC and use it in high power, high current and high frequency applications. An interleaved LLC convertor with current sharing is provided in the present invention to solve this technical problem. The interleaved LLC convertor with current sharing comprises: an interleaved LLC circuit, consisting of an even number of LLC circuits connected in parallel; and a plurality of windings with the same quantity as that of the LLC circuits. In the interleaved LLC convertor with current sharing, all first polarization terminals of each of LLC circuits at its DC output side together constitute a first output terminal; all first terminals of each of the windings together constitute a second output terminal; a first half of the plurality of windings surround a magnetic core in a first direction, and a second half of the plurality of windings surround the magnetic core in a second direction; each of the plurality of windings has the same inductance, and the first half of the plurality of windings are inversely coupled with the second half of the plurality of windings; and the second polarization terminal of each LLC circuit at its DC output side connects to a second terminal of one of the windings.

As an improvement of the present invention, based on said interleaved LLC convertor with current sharing, the interleaved LLC convertor with current sharing further comprises an output capacitor connected between the first output terminal and the second output terminal. As another improvement of the present invention, said output capacitor is an electrolytic capacitor.

As a further improvement of the present invention, the magnetic core in said interleaved LLC convertor with current sharing is closed magnetic core.

As a further improvement of the present invention, the interleaved LLC circuit in the interleaved LLC convertor with current sharing consists of two LLC circuits connected in parallel.

As a further improvement of the present invention, the inductance of the winding in said interleaved LLC convertor with current sharing is no more than $L_r/n^2$, wherein n is the turn ratio of transformer of the LLC circuit, $L_r$ is the inductance of the resonant inductor in the LLC circuit if the plurality of windings are not included in the interleaved LLC convertor with current sharing. As a further improvement of the present invention, the inductance of said winding is no more than $L_r/(2 \cdot n^2)$ As a further improvement of the present invention, the tolerance of the resonant parameters (resonant inductance $L_r$, resonant capacitance $C_r$) of the LLC circuit in said interleaved LLC convertor with current sharing is no more than 10%.

BRIEF DESCRIPTION OF THE DRAWINGS

FIG. 5c illustrates an output current waveform according to the embodiment shown in FIG. 5a with the 5% component tolerance.

DETAILED DESCRIPTION OF THE PREFERRED EMBODIMENTS

To make the purpose, technical solution and advantages of the present invention fully understood, the present invention will now be discussed in further detail below with reference to the aforesaid figures. It should be understood that the description of the preferred embodiments herein is only for illustration purpose, not as any limitation to the present invention.

Figure 4A:
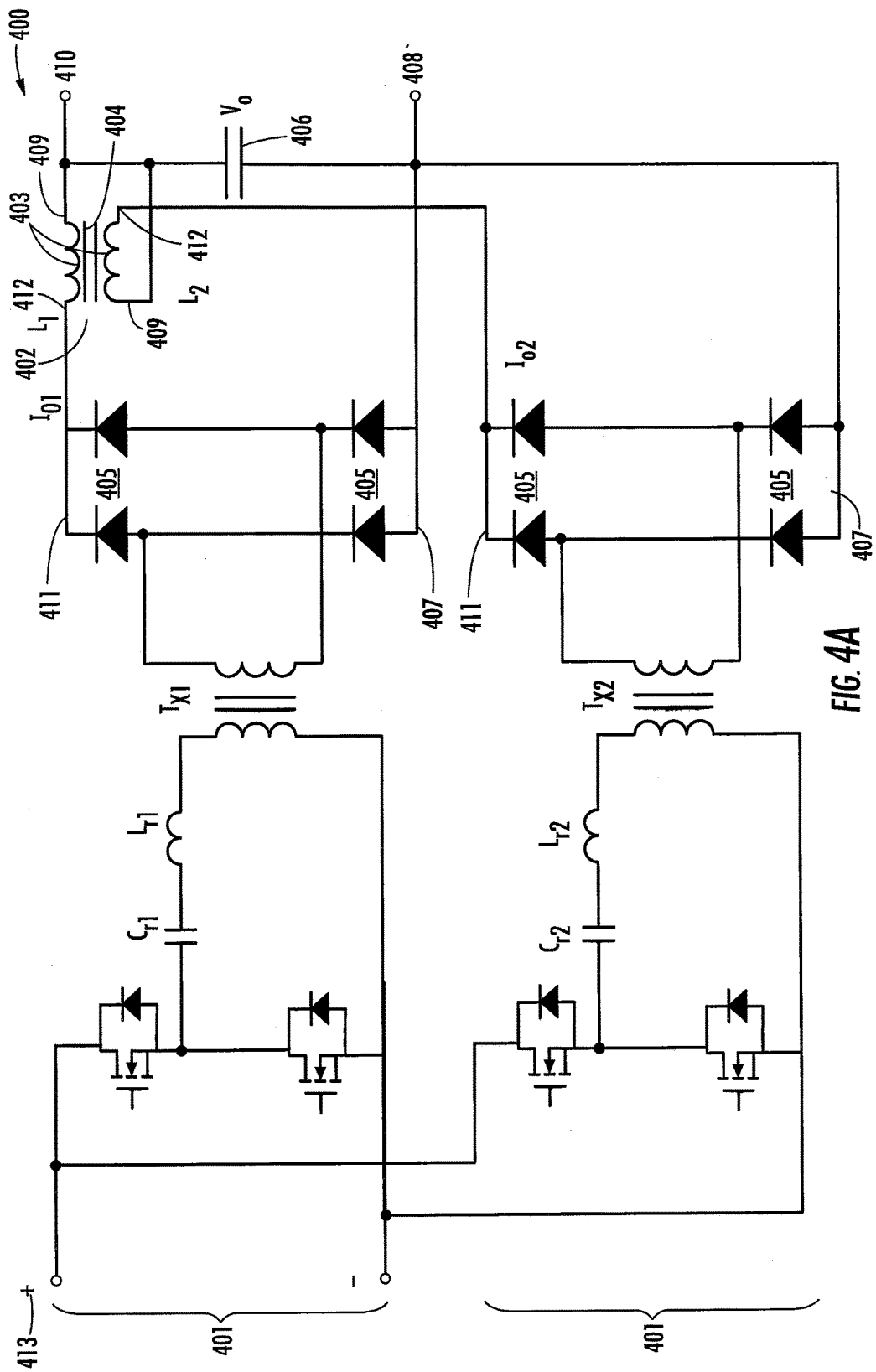
FIG. 4a illustrates a topological diagram according to an embodiment of the present invention.

By invoking the current sharing effect of coupled inductor, an interleaved LLC convertor with current sharing 400, as shown in FIG. 4a is provided according to an embodiment of the present invention. The interleaved LLC convertor with current sharing 400 comprises an interleaved LLC circuit which consists of two LLC circuits 401 connected in parallel, and a coupled inductor 402. The LLC circuits 401 could be of any commercially available LLC topology. The coupled inductor 402 consists of two windings 403 and a magnetic core 404, positioned between the output diode 405 of the LLC circuit 401 and the output capacitor 406 of the LLC convertor with current sharing 400. The magnetic core 404 may be opened magnetic core or closed magnetic core. Preferably, the magnetic core is a closed magnetic core. By using the closed magnetic core, there is less interference to the surrounding components, and it is easier to fabricate the inductors with a plurality of windings. As shown in FIG. 4a, the positive terminals 407 of the two LLC circuits at their DC output sides together constitute a first output terminal 408; and the first terminals 409 of the two windings 403 together constitute a second terminal 410. And one of the two windings surround the magnetic core 404 in a first direction, while the other one of the two windings surround the magnetic core 404 in a second direction. Each of the two windings has the same inductance, and inversely coupled with each other on the magnetic core 404. Moreover, the negative terminals 411 of each of the two LLC circuits 401 at its DC output side connects to second terminals 412 (i.e. the terminals not constituting the second output terminal 410 with the other winding 403) of the two windings 403 respectively. Said output capacitor 406 is connected between the first output terminal 408 and the second output terminal 410; the output capacitor 406 is a common capacitor which is available in the market, such as film capacitor or electrolytic capacitor.

Figure 1:
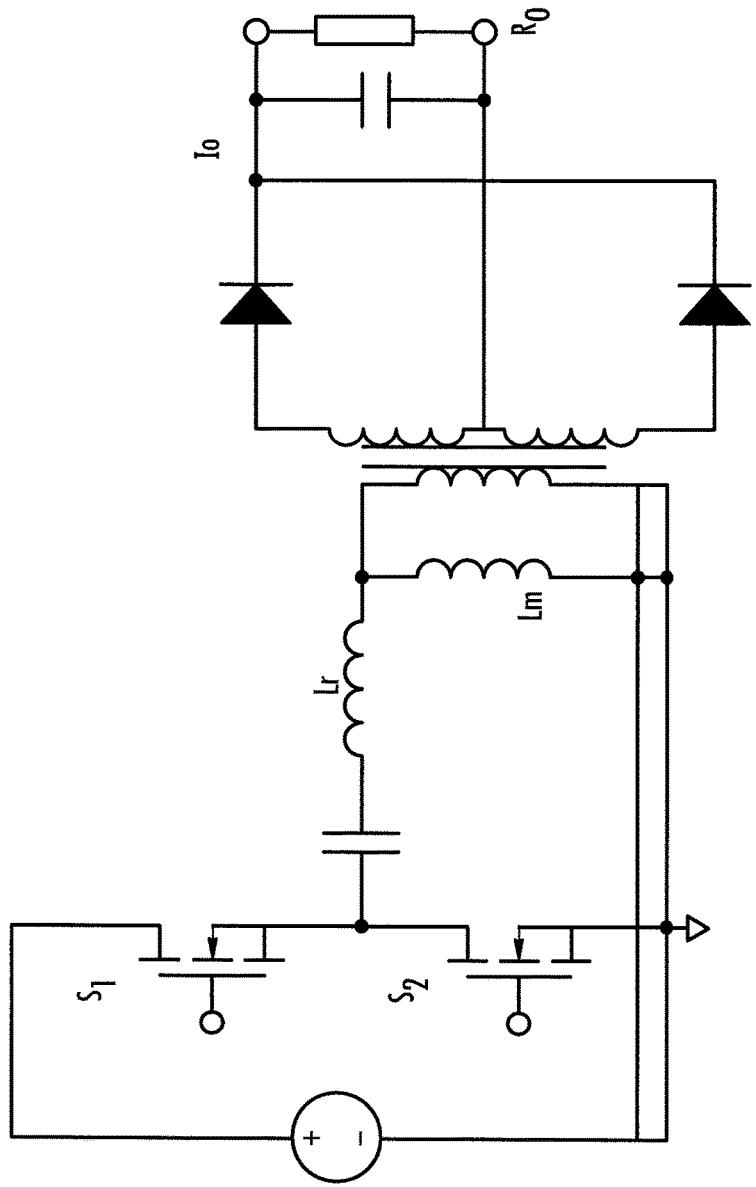
FIG. 1 illustrates a topological diagram of a HB LLC according to prior art.
Figure 2:
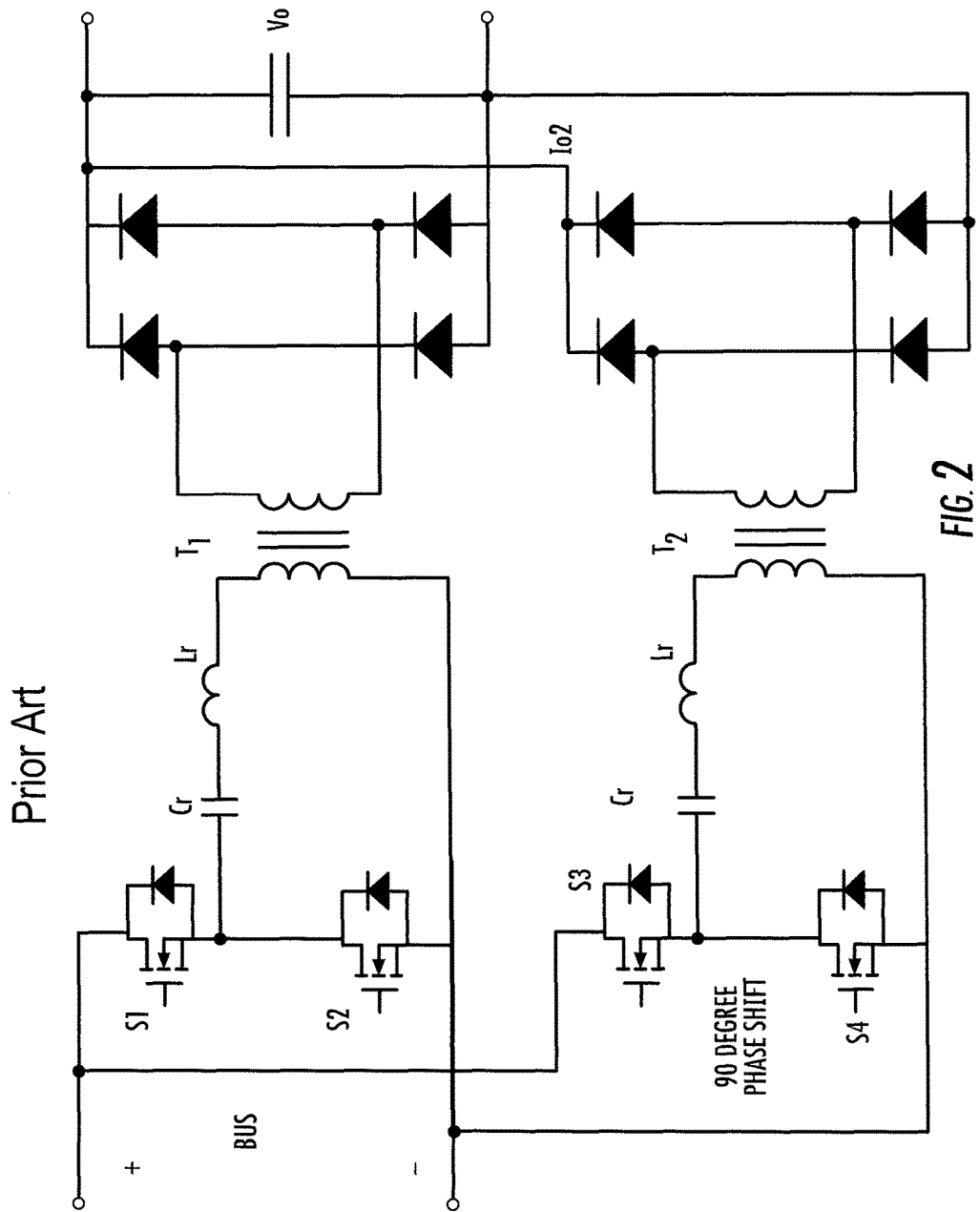
FIG. 2 illustrates a topological diagram of an interleaved LLC according to prior art.
Figure 3:
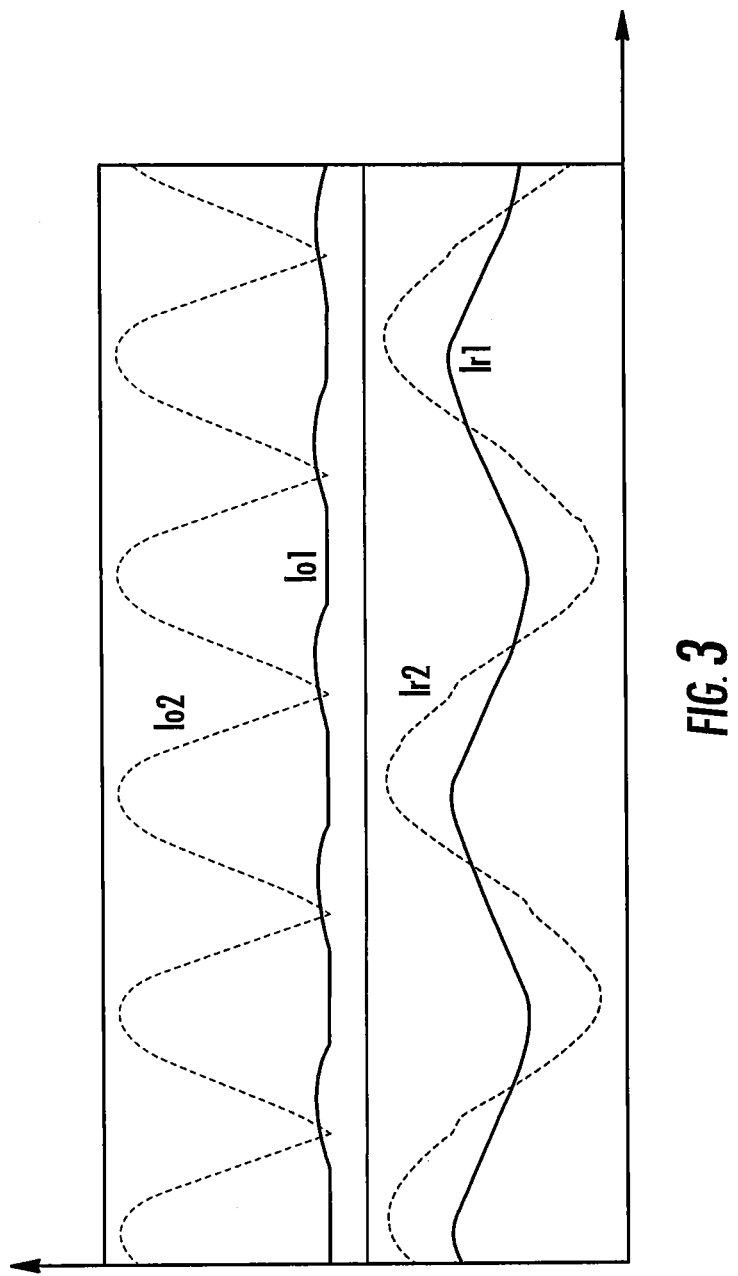
FIG. 3 illustrates a diagram of current simulation waveform with 5% tolerance of $L_r$ & $C_r$.

The embodiment shown in FIG. 4a can be taken as the resonant inductances $L_r$ of T1&T2 in a simple interleaved LLC circuit (see FIG. 2) being split respectively into $L_{r1}$&$L_1$ and $L_{r2}$&$L_2$, wherein $L_{r1}$&$L_{r2}$ are positioned in the resonant cavity and involved in resonance, and the inductance of them is $\alpha \cdot L_r$ ($\alpha$ is the coefficient of the inductance shared by resonant inductance at the primary side); each of $L_1$&$L_2$ is respectively the inductance generated on the magnetic core 404 by the two windings 403 coupled with each other and positioned after the output diodes 405, and each of the inductances is $(1-\alpha) \cdot L_r/n^2$, wherein n is the turn ratio of transformer. The interleaved LLC would make use of the portion of the coupled inductor 402 in the secondary side so that, when the current of the LLC circuits 401 is unbalance, different mutual inductance will be generated on the coupled inductor 402 due to the effect of current and can be added to the primary side and involved in the resonance during operation, thus achieving the current sharing. According to the aforesaid description, $\alpha$ should be above zero, or the LLC circuit would no longer exist since there is no inductance at the primary side at all. Hence, when $\alpha$ is above zero, each of the inductances at the secondary side $L_1$&$L_2$ is less than $L_r/n^2$ according to an embodiment of the present invention. Since higher the inductance of the coupled inductor 403 is, higher the voltage stress bared by the diode 405 would be, the inductance of the coupled inductor should not be too high, considering the efficiency issue and the stress on the output diode 405 given by the coupled inductor 402. Therefore, each of the inductances at the secondary side $L_1$&$L_2$ is no more than $L_r/(2 \cdot n^2)$.

The operating frequency of each of the LLC circuits 401 in the interleaved LLC convertor with current sharing 400 may be different. However, the operating frequencies of the LLC circuits 401 in the interleaved LLC convertor with current sharing 400 are equal according to a preferred embodiment of the present invention. According to this embodiment, because the operating frequencies of the LLC circuits 401 are equal, we can use a controller (not shown in FIG. 4a) to control all the LLC circuits 401 which constitute the interleaved LLC circuit 400. Compared with the device with different operating frequencies, the device with such control method is easier to be controlled with lower manufacture cost.

There is no limitation on the difference of the phase angles of the LLC circuits 401 in the interleaved LLC convertor with current sharing 400, when the LLC circuits 401 operate in parallel. However, the difference of the phase angles of the LLC circuits 401 in the interleaved LLC convertor with current sharing 400 is 180/N degree, when the LLC circuits 401 operate in parallel, according to a preferred embodiment of the present invention, wherein N is the quantity of the LLC circuits 401. When the difference of the phase angles is 180/N degree, the output current ripple is of its minimum amount; and compared with the device in which the difference of the phase angles between each of the LLC circuits 401 is not 180/N degree, the output capacitance 406 needed in the device according to this embodiment is smaller.

The LLC convertor with current sharing 400 may also be connected to a single input power source or multiple different input power sources. However, according to a preferred embodiment, the LLC convertor with current sharing also includes a single input power source 413, and the single input power source 413 is suitable for the implementation of a topology of two stages (not shown in FIG. 4a) in which the former is of high power/high current PFC. Since current sharing circuits can be configured in such structure, the integration level of the module is improved, and the application of high power level is simplified.

There are certain tolerances in all of the component parameters of the LLC circuit 401, and the orientations and the specific values of the tolerances are difficult to be controlled accurately, in practical applications. Normally, the component tolerance can only be controlled within a certain percentage. According to an embodiment of the present invention, the tolerance of the resonant parameters of the LLC circuit 401 is no more than 10%. Since bigger the deviation allowed by the components of the LLC circuit is, higher the coupled inductance 402 needed to achieve the current sharing accuracy as required is, thus higher the voltage stress the diode 405 suffers, therefore the parameter tolerance of the components of the LLC circuit 401 should be controlled as possible. Preferably, the tolerance of the components of the LLC circuit 401 (resonant inductance $L_r$, resonant capacitance $C_r$) is no more than 5%.

Figure 4B:
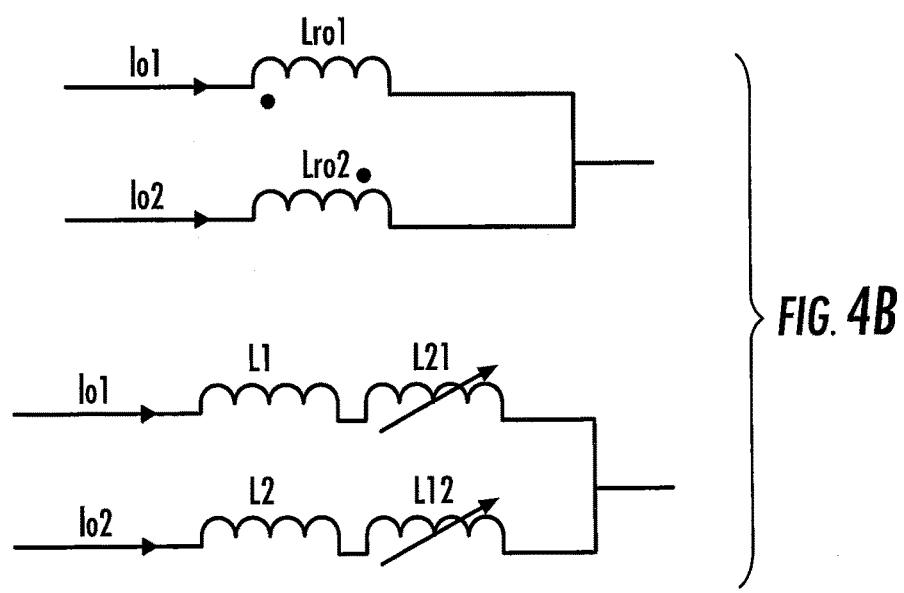
FIG. 4b illustrates a diagram of the working principle of coupled inductors.

As aforesaid, the tolerance of the component parameters of the LLC circuit 401 is hard to be controlled. Therefore, compared with controlling the tolerance of the parameters of the LLC circuit 401, a more practicable way of current sharing is to keep the distribution of the resonant inductances in the resonant cavities $T_{x1}$&$T_{x2}$ consistent with each other:

$$L_{r1}'=L_{r1}+L_1\cdot n^2;\ \text{and}$$

$$L_r'=L_{r2},\ L_{r1}=L_{r2},\ L_1=L_2,$$

wherein n is the turn ratio of transformer; $L_{r1}$ is the resonant inductance positioned in the primary side after the coupled inductor 402 is joined into the circuit, $L_{r1}'$ is the resonant inductance positioned in the primary side before the coupled inductor is joined into the circuit. Referring to FIG. 4b, as for the coupled inductor 402 with inductance of L:

$$L_{21}=-M\cdot I_{o2}/I_{o1};$$

$$L_{12}=-M\cdot I_{o1}/I_{o2};$$

$$L_{ro1}=L_1+L_{21};\ \text{and}$$

$$L_{ro2}=L_2+L_{12},$$

wherein $L_{ro1}$&$L_{ro2}$ are the inductance after the combined effect of the actual inductance of the coupled inductor 402 and the mutual inductance; $L_{12}$&$L_{21}$ are the mutual inductances with mutual effect. Thus, when $I_{o1}>I_{o2}$, for:

$$L_{ro1}>L_{ro2};$$

$$f_{r1}<f_{r2};$$

$$f_{n1}>f_{n2};\ \text{and}$$

$$Q_1<Q_2,\ \text{so}\ I_{o1}<I_{o2}.$$

Thus, the coupled inductor 402 in the embodiment as shown in FIG. 4a can carry out negative feedback, so that the current sharing between the two LLC circuits 401 can be achieved.

Figure 5A:
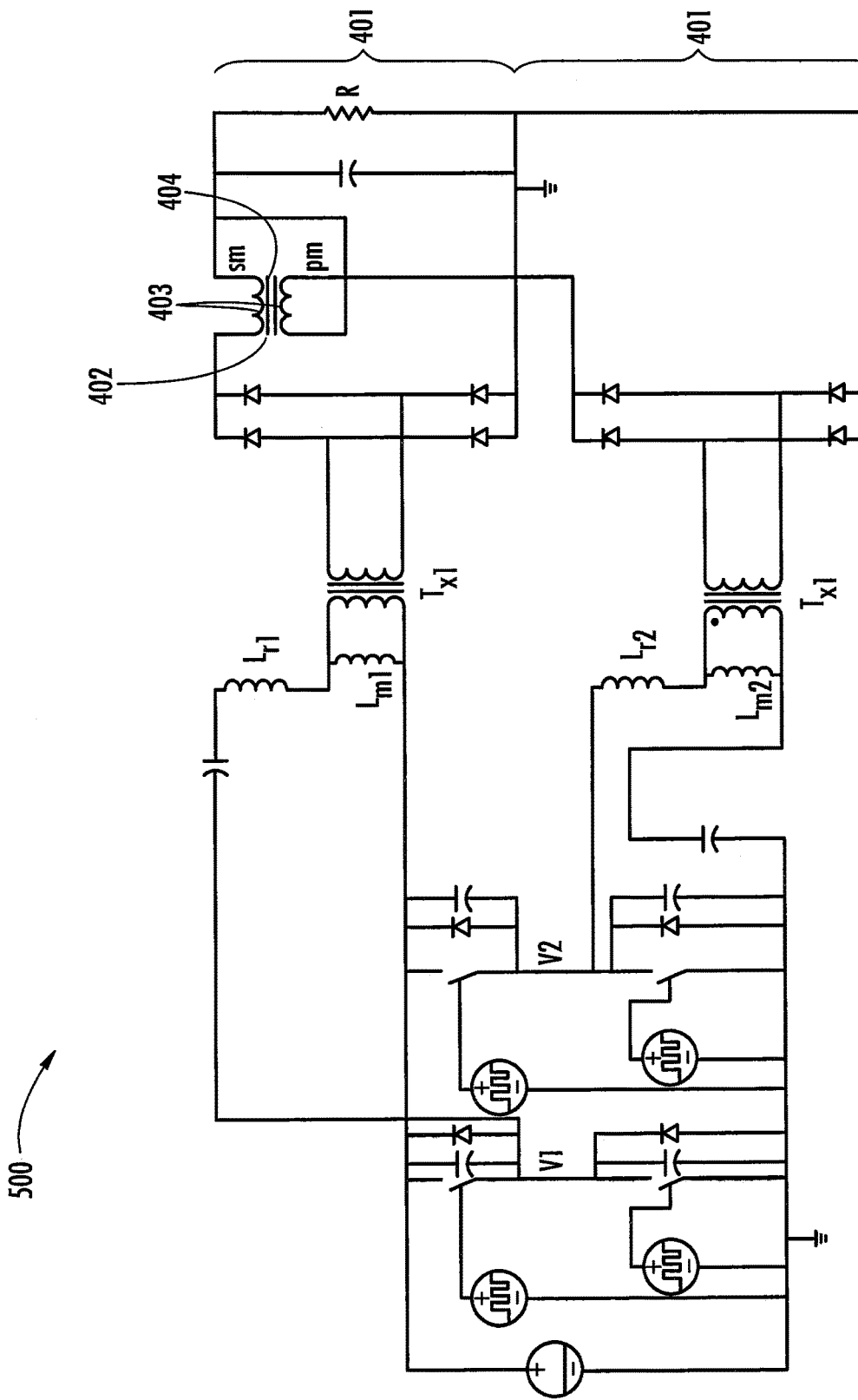
FIG. 5a illustrates a topological diagram according to an embodiment of the present invention.
Figure 5B:
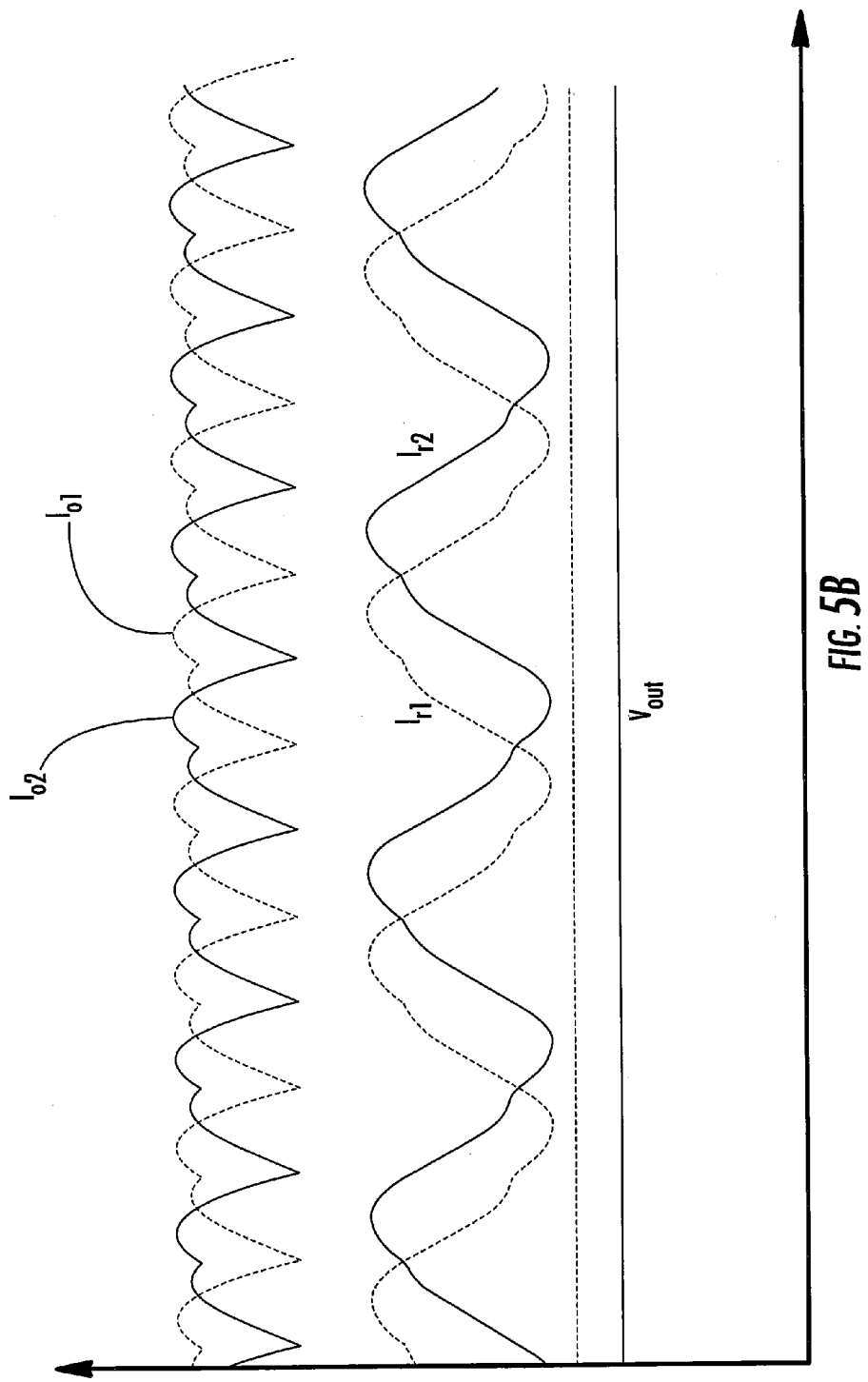
FIG. 5b illustrates an output current waveform according to the embodiment shown in FIG. 5a, wherein the 5% component tolerance is not included.

Referring now to FIG. 5a, according to another embodiment of the present invention, the interleaved LLC convertor with current sharing 500 consists of 900 W interleaved HB LLC. The interleaved LLC circuit comprises two LLC circuits 401, and coupled inductor 402 which consists of two windings 403 of same inductance values inversely surrounding the closed magnetic core 404. The rest parameters of the interleaved LLC convertor with current sharing 500 according to the present embodiment are as following described: $L_r$=25 µH; $C_r$=64 nF; $L_m$=120 µH; operating frequency is 125 kHz; the actual turn radio of transformer is 15:4; the output load R=3Ω. When the component tolerance of the LLC circuit 401 is ±5% and under the worst condition, $C_{r1}$=1.05·$C_r$, $C_{r2}$=0.95·$C_r$, and the current sharing accuracy of the interleaved LLC convertor with current sharing 500 can be expected to reach 10%. Under the condition of the component tolerance of 5%, $L_{r1}$=α·$L_r$·1.05 and $L_{r2}$=α·$L_r$·0.95. The inductance which should be distributed to the secondary side before considering different mutual inductance is k, wherein k varies between 0 to (1−α)·$L_r$. When α=0.6, the gain range calculated is 1.02~1.07. Based on the simulation conditions above, the inductances can be distributed as 15 µH and 10 µH, and if there is no component tolerance in the two LLC circuits, the waveform of the output current of the two LLC circuits would be as shown in FIG. 5b; and if the tolerance of the parameter $T_{x1}$ of the resonant cavity increase +5% and the tolerance of the parameter $T_{x2}$ of the resonant cavity increase −5%, the waveform of output current of the two LLC circuits would be as shown in FIG. 5c. Under the condition in which there is no component tolerance as shown in FIG. 5a, the output current $I_{O1}$ & $I_{O2}$ would be in a balanced state; under the condition in which there is ±5% component tolerance as shown in FIG. 5c, the output current $I_{(SP)}$ & $I_{(PM)}$ can also achieve the 10% current sharing accuracy. Thus the interleaved LLC convertor with current sharing 500 can advantageously overcome the unbalanced current distribution issue in the prior art which is caused by the unpredictable parameters of the resonant cavity of LLC.

Figure 6:
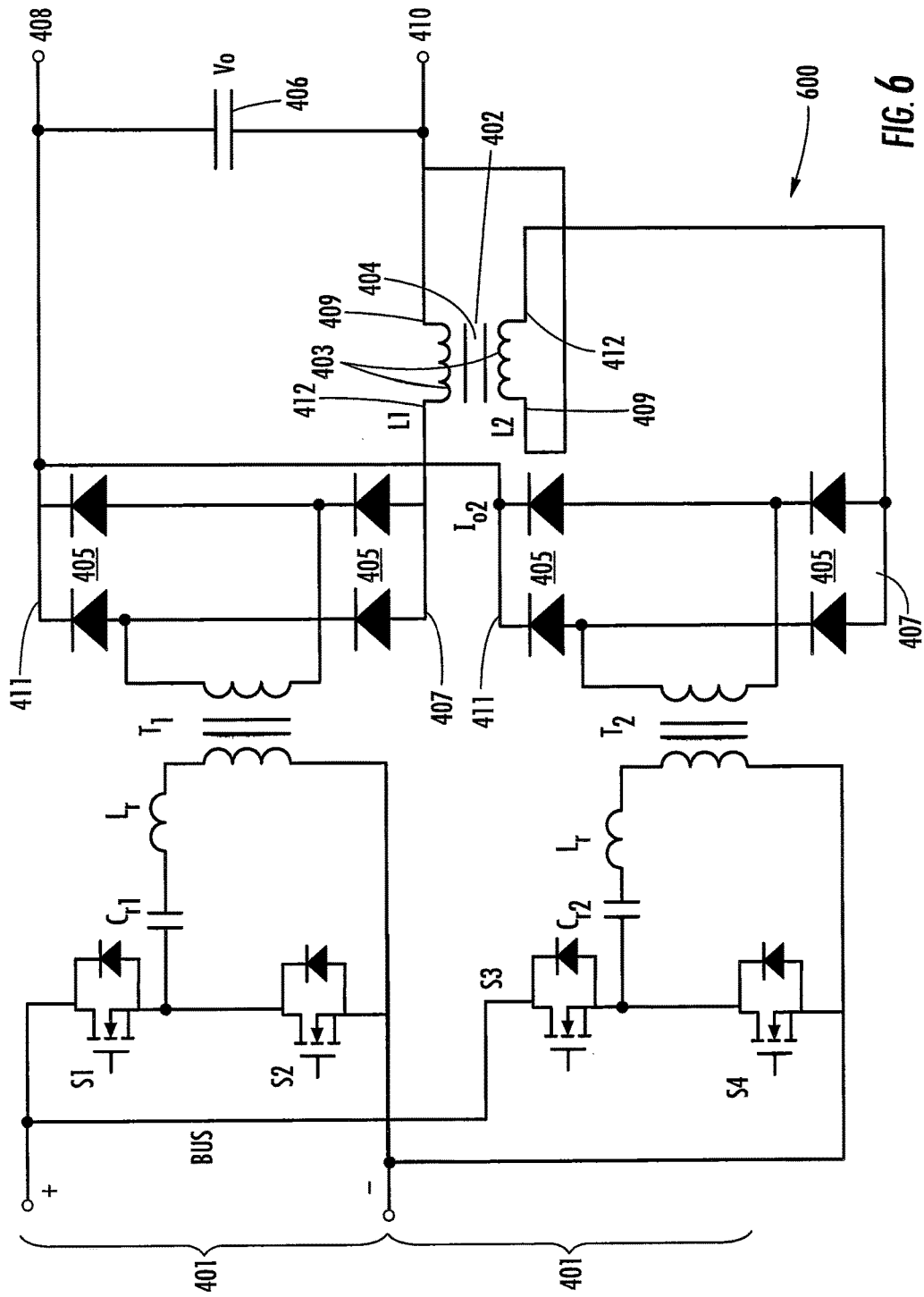
FIG. 6 illustrates a topological diagram according to an embodiment of the present invention.

The two LLC circuits in the interleaved LLC convertor with current sharing shown in the aforesaid embodiments (FIG. 4a, 5a) are both connected to the coupled inductors by the negative terminals of the diodes of the output terminals at the DC side. As shown in FIG. 6, in the interleaved LLC convertor with current sharing 600 in an embodiment according to the present invention, the two LLC circuits 401 are connected to the coupled inductors 402 by the positive terminals 407 of the diodes of the output terminals at DC side. When the two LLC circuits are connected to the coupled inductor 402 by the positive terminals 407 of the diodes 405, all of the negative terminals 411 at the DC output side of the LLC circuits 401 together constitute a first output terminal 408; and the first terminals 409 of the two windings 403 together constitute a second output terminal 410. Then one of the two windings 403 winds surround the magnetic core 404 of the coupled inductor 402 in a first direction, and the other of the two windings surround the magnetic core 404 in a second direction. Different from the embodiments shown in FIGS. 4a & 5a, the positive terminals 407 at the DC side of the two LLC circuits 401 are connected to the second terminals 412 of the two windings 403 respectively (i.e. the terminals not together constituting the second output terminal 410 with the other winding 403). As the same as in the embodiments shown in FIGS. 4a & 5a, the two windings 403 according to the present embodiment have equal inductance, and constitute inverse coupling on the magnetic core 404; and the output capacitor 406 is connected between the first output terminal 408 and the second terminal 410. Though the polarizations of coupling are different, there is no difference between the present embodiment and the embodiments shown in FIGS. 4a & 5a, as for the current sharing effect.

Figure 7:
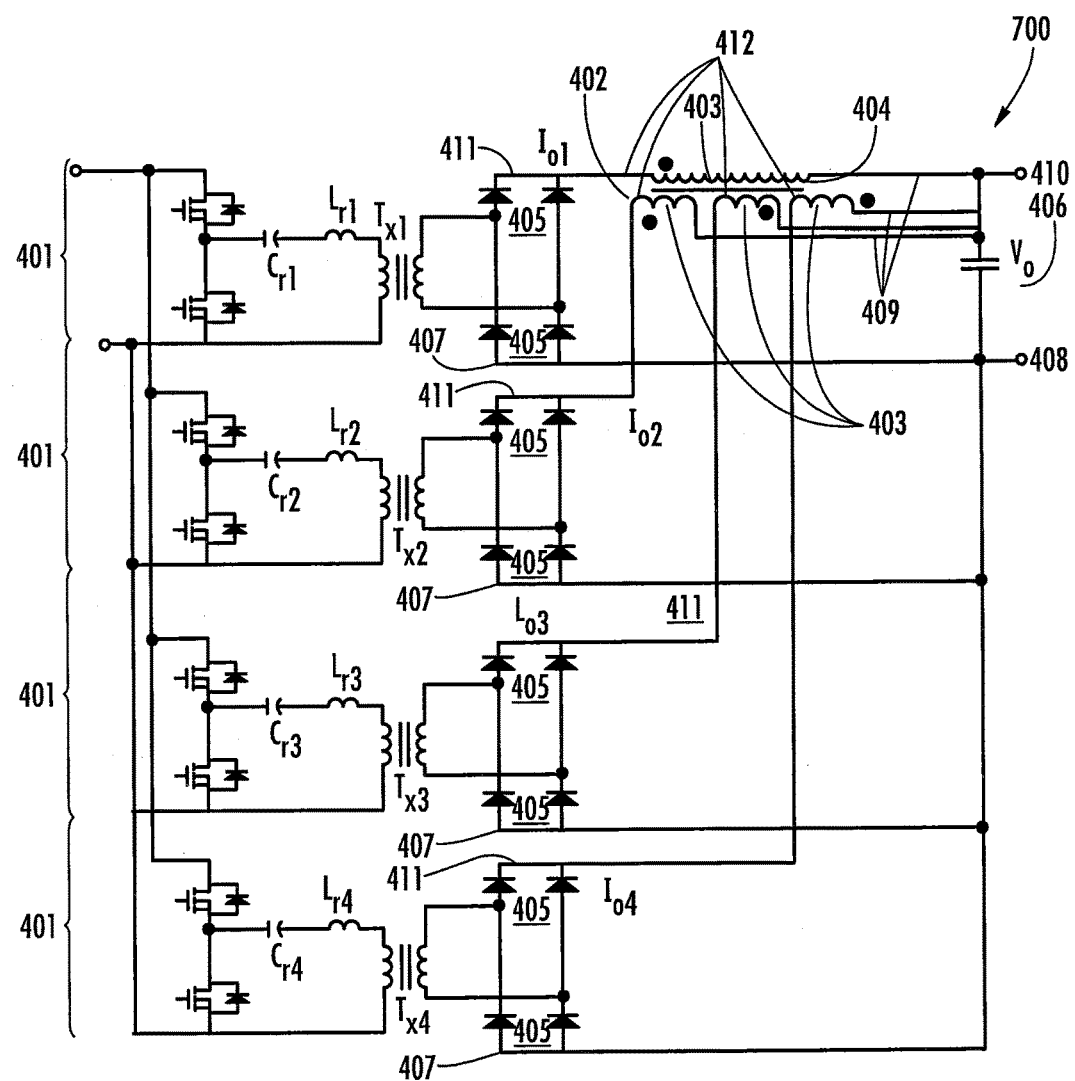
FIG. 7 illustrates a topological diagram according to an embodiment of the present invention.

The interleaved LLC convertors with current sharing in the aforesaid embodiments all comprise two parallel connected LLC circuits. There are four LLC circuits 401 parallel connected in the embodiment shown in FIG. 7 which shows that the interleaved LLC convertor with current sharing can be used with any even number of interleaved LLC circuits connected in parallel. Referring now to FIG. 7, in an embodiment according to the present invention, the interleaved LLC convertor with current sharing 700 consists of an interleaved LLC circuit which is constituted by four LLC circuits 401 connected in parallel, and a coupled inductor 402. The LLC circuits 401 could be of any commercially available device having common LLC topology. The coupled inductor 402 consists of four windings 403 and a closed magnetic core 404, positioned between the output diode 405 of the LLC circuit 401 and the output capacitor 406 of the interleaved LLC convertor with current sharing 700. As shown in FIG. 7, the positive terminals 407 at the DC output side of the four LLC circuits 401 together constitute the second output terminal 408; and the first terminal 409 of the four windings 403 together constitute the second output terminal 410. Then two of the four windings 403 surround the magnetic core 404 in a first direction, the other two of the four windings 403 surround the magnetic core 404 in a second direction. The four windings 403 have equal inductance, and constitute inverse coupling on the magnetic core 404. Last but not the least, the negative terminals 411 at the DC output side of the four LLC circuits are connected to the second terminals 412 of the four windings 403 respectively (i.e. the terminals not together constituting the second output terminal 410 with the other winding 403). The aforesaid output capacitor 406 is connected between the first output terminal 408 and the second output terminal 410; the output capacitor 406 is a common capacitor which can found in the market, such as film capacitor or electrolytic capacitor.

It should be understood that the features and operations of the invention as described in detail are susceptible to modification and improvement without departing from the spirit and scope of the invention as claimed below. Thus the scope of the claimed technical solution is not limited by any certain embodiment above-mentioned.

What is claimed is:

1. An interleaved LLC convertor, comprising:
   an even number of LLC circuits connected in parallel; and
   a plurality of windings with the same quantity as that of the LLC circuits, each of the windings having a first terminal and a second terminal, wherein:
   all first polarization terminals of the LLC circuits at a DC output side together constitute a first output terminal;
   all the first terminals of the windings together constitute a second output terminal;
   wherein a first group of the plurality of windings is inversely magnetically coupled to a second group of the plurality of windings;
   wherein the windings of the plurality of windings have the same inductance, and the first group of the plurality of windings are inversely coupled with the second group of the plurality of windings;
   wherein each of the windings has an inductance of no more than $L_r/n^2$, wherein n is a turns ratio of transformers of the LLC circuits and $L_r$ is an inductance of resonant inductors of the LLC circuits; and
   wherein respective second polarization terminals of the LLC circuits at the DC output side connect to respective ones of the second terminals of the windings.

2. The interleaved LLC convertor of claim 1, further comprising an output capacitor connected between the first output terminal and the second output terminal.

3. The interleaved LLC convertor of claim 1, wherein the LLC circuits have the same operating frequency.

4. The interleaved LLC convertor of claim 1, comprising two LLC circuits connected in parallel.

5. The interleaved LLC convertor of claim 1, wherein a phase difference of the LLC circuits is 180/N degrees and N is a quantity of the LLC circuits included in the interleaved LLC convertor.

6. The interleaved LLC convertor of claim 1, further comprising a single input power source.

7. The interleaved LLC convertor of claim 1, wherein each of the windings has an inductance of no more than $L_r/(2 \cdot n^2)$, wherein n is a turns ratio of transformers of the LLC circuits and $L_r$ is an inductance of resonant inductors of the LLC circuits.

8. An apparatus comprising:
   a DC input port configured to be coupled to a power source;
   a DC output port configured to be coupled to a load;
   first and second LLC circuits having input ports coupled in parallel to the DC input port and output ports having first terminals coupled to a first terminal of the DC output port; and
   a coupled inductor comprising a first winding having a first terminal coupled to a second terminal of the output port of the first LLC circuit and a second terminal coupled to a second terminal of the DC output port and a second winding having a first terminal coupled to a second terminal of the output port of the second LLC circuit and a second terminal coupled to the second terminal of the DC output port, wherein each of the first and second windings has an inductance no greater than $L_r/n^2$, wherein $L_r$ is an inductance of resonant inductors of the first and second LLC circuits and wherein n is a turns ratio of transformers of the first and second LLC circuits.

9. The apparatus of claim 8, wherein the first and second windings are inversely coupled via a magnetic core.

10. The apparatus of claim 8, wherein the first and second LLC circuits operate at the same frequency.

11. The apparatus of claim 8, wherein each of the first and second windings has an inductance no greater than $L_r/2n^2$, wherein $L_r$ is an inductance of resonant inductors of the first and second LLC circuits and wherein n is a turns ratio of transformers of the first and second LLC circuits.

* * * * *